May 31, 1932. H. F. CUNNING 1,861,114
LUBRICATING DEVICE
Original Filed Sept. 21, 1927
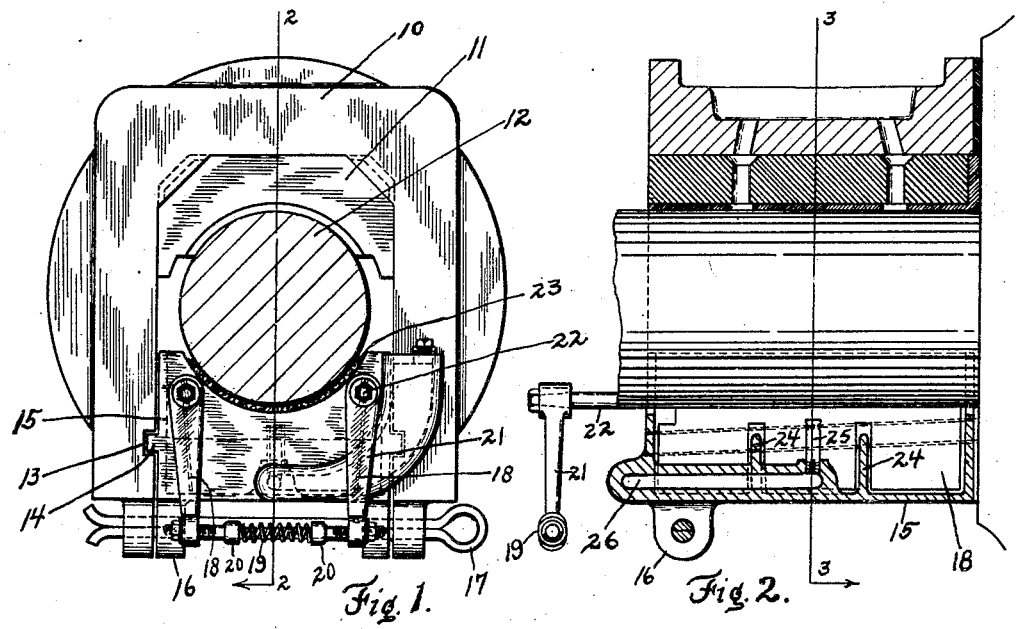
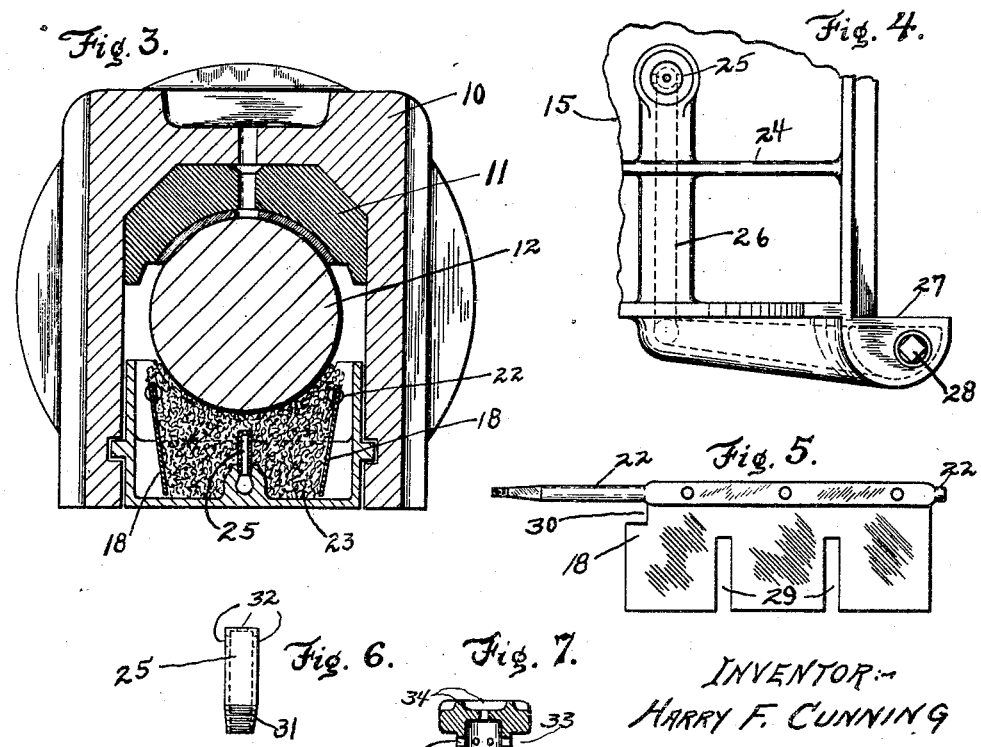

Patented May 31, 1932

1,861,114

UNITED STATES PATENT OFFICE

HARRY F. CUNNING, OF ROANOKE, VIRGINIA

LUBRICATING DEVICE

Application filed September 21, 1927, Serial No. 220,975. Renewed October 4, 1930.

My invention relates to journal lubricators in general, but has special reference to improvements by means of which the journals of locomotives may be reliably and economically lubricated.

Although my invention is applicable to the lubrication of journals and bearings of numerous forms, the need therefor and the advantages therefor will be best understood by referring directly to the particular case of the locomotive and the peculiarly difficult conditions encountered in locomotive lubrication.

The journals of locomotives and particularly those of the truck and trailer are lubricated with oil which is conveyed to the journal by an absorbent or capillary material, such as woolen or cotton waste. This waste, when prepared for use in journals of this type, is technically known as oil waste or sponging. The requirements of this oil waste are that it should contain from 4 to 5 pints of oil to one pound of dry waste. This type of lubrication is also resorted to in the lubrication of freight cars and passenger coaches. In this latter case, however, the service is not so severe, but nevertheless, the same difficulties which my invention seeks to remedy are present. From the above it will be seen that in order to secure proper lubrication the oil waste must be held constantly in contact with the journal, and at the same time the pressure of the waste against the journal must not be excessive.

At the present time the oil waste or sponging is placed in a cellar attached to the locomotive or journal box directly under the journal, and is packed rather tightly therein. The resiliency of the waste is then relied upon to maintain the oil waste into contact with the journal. This method has not proven satisfactory in practice. The principal reason for this is due to the fact that when the waste is saturated with oil, its resiliency is impaired and as the waste is being constantly shaken down, due to vibration of the journal when running, it settles away, and out of contact with the journal and thus allows the latter to run dry. In this event the journal runs hot and produces what is commonly called a hot box, which so frequently causes delays and disastrous wrecks. This result also occurs when the waste is too tightly packed which tends to destroy its conducting properties.

There is no part of a locomotive or car which receives any more attention than the journal boxes. This is particularly true of the boxes on the locomotive and trailer trucks. These journal boxes are usually inspected and repacked at the end of each run or division, and also demand the constant attention of the engineer during the time the locomotive is on the road. Notwithstanding all this work in the way of inspection, cleaning, repacking and oiling the lubricators of the present type are so variable and unreliable that at least 50% of all locomotive failures are directly chargeable to improper or insufficient lubrication of the journals. Such failures cause hours of delay by interrupting traffic on the road. This increases the operating costs and frequently serious damage to the locomotive.

The primary object of my invention is to provide lubricating means which will hold the oil into contact with the journal at all times without destroying its resiliency and thus insure a regular and dependable supply of oil to the journal and bearings.

A further object is to provide a waste supporting means which will hold the waste in contact with the journal and at the same time not pick the waste out of the oil in the oil cellar or reservoir.

Another object of my invention is to provide a lubricating device which will supply oil to the central part of the journal, where it will be most effective and also prevent it from running away at the ends of the bearing and being wasted.

Another object of my invention is to provide a waste supporter which will press the waste into contact with the journal and at the same time leave the edges loose so that wiping of the journal is avoided.

Another object of the invention is to provide a lubricator which will prevent axial and radial displacement of the waste and at the same time require a lesser amount of waste than is now required.

A further object of my invention is to provide a means whereby the pressure of the oil waste against the journal can be varied without disturbing the interior of the journal box.

And a further object of my invention is to provide means whereby the oil in the cellar may be replenished without removing the cellar or waiting for the waste to absorb the oil.

With these and other objects in view, my invention consists in a journal box lubricator having certain novel features of construction and arrangement of parts hereinafter more fully described and claimed, and illustrated in the accompanying drawings, in which:—

Figure 1 is an end view of my invention as applied to a locomotive journal box;

Figure 2 is a longitudinal section view of Figure 1, taken along line 2—2 looking in the direction of the arrow;

Figure 3 is a transverse section of Figure 1, taken along line 3—3 of Figure 2;

Figure 4 is a fragmentary view of the outer right-hand corner of the waste cellar showing the location of the oil reservoir as proposed by my invention;

Figure 5 shows the waste support or follower;

Figure 6 shows the oil outlet pipe which discharges oil from the reservoir into the waste cellar; and Figure 7 is a modified form of outlet pipe.

Referring now to Figure 1 of the drawings, 10 designates a bearing housing having a bearing 11 supported therein and resting upon an axle or journal 12. The bearing housing 10 is provided with grooves 13 which engage runners 14 projecting from a cellar 15. The cellar 15 is also provided with lugs 16 through which a cotter-pin 17 extends for the purpose of holding the cellar in its operative position within the bearing housing 10. The cellar 15 is provided with two movable or waste supporting members 18, which are caused to move toward each other by means of a tension spring 19, the spring 19 being connected in a suitable manner to a pair of screw threaded members 20, which are carried by arms 21. The arms 21 are secured at their upper ends to the shafts 22. These shafts are supported at their ends within the cellar 15 and form a support for the movable members 18, above referred to. The waste designated by the numeral 23 is placed between these two movable supporting members 18, and by reason of the spring 19 is caused to move upwardly, and thus maintain contact with the journal 12.

The members 20 are provided with adjustable means which, in the present case, are shown as screw threads and nuts; these can be adjusted to produce any desired pressure between the oil waste and the journal.

While it is stated that the waste 23, as positioned between the members 18, is raised upwardly against the journal, it will be seen that these members 18 do not perform strictly a lifting function, but that they tend to compress the waste in a horizontal direction and thus cause it to expand in a vertical direction. This not only causes the waste to be partially lifted, but it also maintains a portion of the waste in the oil in the cellar. The spring 19 is provided with adjusting means in the form of the screw threaded members 20 which, when properly adjusted, produce just the proper pressure between the waste and the journal.

Referring now to Figure 2 of the drawings, it will be seen that the shafts 22 extend out from the cellar and that the arms 21 are supported a sufficient distance from the cellar so that the spring 19 will be free to function and move the arms 21 toward each other, as previously described. It will also be noted that the cellar 15 is provided with webs or partitions 24, which form three separate compartments along the journal. These webs or partitions 24, in addition to dividing the waste cellar into compartments, also perform the important function of preventing any axial displacement of the waste. This figure of the drawings also shows an outlet pipe 25 which extends upwardly in the central compartment. The outlet pipe 25 is provided to supply oil to the cellar, and receives its oil through the opening 26. This opening 26 extends from the discharge pipe 25 up to an oil reservoir 27 which is formed integral with the end of the cellar 15. A closure cap 28 is provided which when removed permits the reservoir to be filled. For a detailed showing of the arrangement of the reservoir 27, reference should be had to Figure 4 of the drawings.

By extending the outlet pipe 25 up to a point near the surface of the oil waste 23, the oil will be supplied at a point where most needed. This will saturate the waste in the central compartment first, and the excess oil will be absorbed by the waste in the end compartments.

By referring to Figure 3 of the drawings, it will be seen that the movable members or waste followers 18 are slightly inclined from a vertical position and tend to give the waste 23 an upward movement. At the same time the waste 23 is not lifted from the bottom of the cellar 15 and therefore a thread connection between the bottom of the cellar and the journal is maintained and a continuous conduit for the lubricating oil is thus provided through the waste. It should also be noticed in connection with this figure that by reason of this arrangement the waste will not pack against the sides of the journal at its upper edges, since the point of greatest pressure will be near the center line of the journal. This feature is very important as it is desirable that means be provided which will avoid a pressure being exerted by the waste 23 upon the journal 12 at its sides, for if this were the case, the waste would tend to wipe the oil from the journal and thus reduce the amount of oil supplied to the bearing surfaces.

By referring to Figure 5 of the drawings it will be seen that the movable member 18 is provided with slits 29 which form a clearance for the webs 24 located in the cellar. The member 18 is also provided with a cutaway portion 30 which facilitates assembly of the member 18 in the cellar 15. This cutaway portion 30 when the member 18 is held in an upwardly position will permit the shaft 22 being extended out through the front wall of the cellar a sufficient distance to allow the inner end of the shaft 22 being slipped into an opening formed in the rear wall of the cellar. After the shaft 22 has been slipped into position the movable member 18 is then allowed to drop downwardly into its normal position within the cellar and the shaft will then be retained in place without any additional securing means being necessary.

In Figure 6 the outlet pipe 25 is shown in detail. This pipe is provided with standard pipe threads 31 at its lower end and with a series of openings 32 at its upper end.

The operation of this device is as follows:—

After the cellar has been properly packed with oil waste, it is placed in its operative position with respect to the journal and secured therein by means of the pin 17. An additional supply of oil can then be poured into the reservoir 27 through the opening 28. The lubricating device is then in condition for operation. In order to replenish the oil in the cellar which is frequently done at the end of the run the attendant merely removes the plug 28 and fills the reservoir 27. The oil then feeds out through the waste and in this manner the oil supply is replenished without the removal of the cellar being necessary. During the operation of the journal the movable members 18 will function to continually raise and maintain the waste against the underside of the journal. As a result of this construction the tendency of the waste to settle down or become packed due to vibration will be eliminated as the members 18 will yield and thus prevent any packing to take place. As a direct result of this the waste will retain its resilient condition. These movable supporting members 18 will also function to maintain the waste in a central position with respect to the journal.

In journals of this type it has been found that where oil is applied midway the ends of the journal it will spread in both directions and as a result of this discovery I have located the outlet pipe 25 substantially midway the ends of the journal. The outlets 32 in the pipe 25 are located at a point near the surface of the waste and as oil is discharged therefrom the waste nearest this point will contain the greatest amount of oil. With this construction the major portion of the oil will be supplied to the journal midway its ends and since the waste in the outer or end compartments contains a relatively lesser quantity of oil it will be seen that the waste in the end compartments while also providing lubrication for the journal will tend to absorb any excess of oil flowing along the shaft from the center in either direction and thus avoid a waste of oil at the ends thereof.

At the present time where waste is relied upon as a conducting means for the lubricating oil, a large amount of the waste is not put to useful work since its principal function is to pack the journal box full so as to maintain a portion of the waste in contact with the journal. Under these conditions it will be seen that my invention will effect a considerable saving in waste. This saving is considerable when it is realized that the ordinary 6 x 11 journal box requires approximately 19½ pounds of waste, 80% of which is oil. A further source of saving can be effected by the use of cotton waste, which can be successfully used with my device, since the fibrous qualities of wool waste are not required to maintain contact with the journal. Another and incidental result accomplished by my device is that the end compartments will catch any water which might find its way into the cellar and thus prevent it mixing with the new oil as it is supplied to the journal.

Since it is obvious that numerous modifications of my invention will readily suggest themselves to one skilled in the art, I desire to have it understood that I do not confine my invention to the specific construction shown herein, but desire to cover all modifications which come within the spirit and scope of the following claims:

Having thus described my invention, I claim as new and desire to secure by Letters Patent:—

1. In a journal box, a lubricating cellar adapted to receive oil-waste, a pair of movable members within said cellar adapted to engage and hold said oil-waste in contact with said journal, arms secured to said movable members extending out of said cellar, and a spring secured to said arms for causing said movable members to move toward each other to thereby compress said waste.

2. In a journal box, a lubricating cellar adapted to receive oil-waste, a pair of substantially vertical downwardly depending members pivotally mounted in the cellar and arranged to hold the waste therebetween, and means cooperating with said vertical members whereby said waste is compressed between said vertical members and thus raised by the joint action of said vertical members into contact with said journal.

3. In a journal box a lubricating cellar adapted to receive oil-waste, webs in said cellar forming a plurality of compartments along said journal, and means extending into said compartments adapted to hold the oil-waste therein into contact with said journal.

4. In a journal box, a lubricating cellar adapted to receive oil-waste, a pair of supports pivotally mounted in and extending through said cellar parallel with the journal, arms secured to said supports, a spring between said arms tending to rotate said supports, and means secured to said supports adapted to compress the waste between the supports and raise the upper surface of said waste into contact with said journal while maintaining it in contact with the bottom of the cellar.

5. In a journal box, a lubricating cellar adapted to receive oil-waste, webs in said cellar forming a plurality of compartments extending along said journal, a pair of substantially vertical members arranged on each side of the journal and supported at each end by the end walls of said cellar for compressing the waste therebetween whereby it will be held in contact with the journal, and recesses in said vertical members through which said webs pass, whereby said vertical members can extend downwardly into each of said compartments and compress the waste therein.

6. In a journal box, a lubricating cellar adapted to receive oil-waste, webs extending transversely across said cellar, and movable means extending longitudinally through said cellar, said webs acting to prevent axial displacement of said oil-waste and said movable means acting to hold said oil-waste into contact with said journal and prevent radial displacement of said oil-waste.

In witness whereof, I have hereunto set my hand this 25th day of August, 1927.

HARRY F. CUNNING.